(12) United States Patent
Livingood

(10) Patent No.: US 7,940,746 B2
(45) Date of Patent: May 10, 2011

(54) METHOD AND SYSTEM FOR LOCATING A VOICE OVER INTERNET PROTOCOL (VOIP) DEVICE CONNECTED TO A NETWORK

(75) Inventor: Jason D. Livingood, Philadelphia, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1796 days.

(21) Appl. No.: 10/924,485

(22) Filed: Aug. 24, 2004

(65) Prior Publication Data

US 2006/0056388 A1    Mar. 16, 2006

(51) Int. Cl.
*H04L 12/66* (2006.01)

(52) U.S. Cl. ........ 370/352; 370/267; 370/328; 370/356; 370/389; 379/88.17; 455/404.2; 455/422.1

(58) Field of Classification Search ............... 370/267, 370/352, 328, 356, 389; 379/37, 45, 221.01, 379/88.17; 455/404.1, 404.2, 456.1, 422.1
See application file for complete search history.

(56) References Cited

U.S. PATENT DOCUMENTS

| | | |
|---|---|---|
| 4,456,925 A | 6/1984 | Skerlos |
| 4,620,289 A | 10/1986 | Chauvel |
| 4,725,694 A | 2/1988 | Auer |
| 4,878,048 A | 10/1989 | Gottesman |
| 4,916,441 A | 4/1990 | Gombrich |
| 4,922,529 A | 5/1990 | Kiel |
| 4,995,074 A | 2/1991 | Goldman |
| 5,014,267 A | 5/1991 | Tompkins |
| 5,157,717 A | 10/1992 | Hitchcock |
| 5,187,710 A | 2/1993 | Chau |
| 5,253,341 A | 10/1993 | Rozmanith |
| 5,274,700 A | 12/1993 | Gechter |
| 5,276,731 A | 1/1994 | Arbel |
| 5,301,050 A | 4/1994 | Czerwiec |
| 5,335,276 A | 8/1994 | Thompson |
| 5,341,425 A | 8/1994 | Wasilewski |
| 5,349,638 A | 9/1994 | Pitroda |
| 5,363,431 A | 11/1994 | Schull |
| 5,375,161 A | 12/1994 | Fuller |
| 5,393,964 A | 2/1995 | Hamilton |
| 5,406,557 A | 4/1995 | Baudoin |
| 5,406,564 A | 4/1995 | Okita |
| 5,406,615 A | 4/1995 | Miller, II |
| 5,428,608 A | 6/1995 | Freeman |

(Continued)

FOREIGN PATENT DOCUMENTS

AU    199859680    9/1998

(Continued)

OTHER PUBLICATIONS

Bodamer, Charging in Multi—Service Networks, University of Stuttgart, 16 pages, Nov. 12, 1998.

Odlyzko, et al., A Modest Proposal for Preventing Internet Congestion, Dimacs Technical Report, pp. 1-25, Sep. 1997.

PKT-TR-ARCH-V01-991201, Packetcable 1.0 Architecture Framework Technical Report, CableLabs, pp. 1-64, Dec. 1, 1999.

(Continued)

*Primary Examiner* — Gerald Gauthier
(74) *Attorney, Agent, or Firm* — Banner & Witcoff, Ltd.

(57) ABSTRACT

A method and system for locating a device connected to a network by determining a current network address for the device and comparing the current network address to a network address in a user profile. If the network addresses match, the device is located based on a physical address associated with the network address in the user profile.

27 Claims, 1 Drawing Sheet

U.S. PATENT DOCUMENTS

| | | |
|---|---|---|
| 5,449,970 A | 9/1995 | Kumar |
| 5,479,411 A | 12/1995 | Klein |
| 5,483,588 A | 1/1996 | Eaton |
| 5,488,412 A | 1/1996 | Majeti |
| 5,512,935 A | 4/1996 | Majeti |
| 5,533,110 A | 7/1996 | Pinard |
| 5,534,913 A | 7/1996 | Majeti |
| 5,537,157 A | 7/1996 | Washino |
| 5,546,316 A | 8/1996 | Buckley |
| 5,546,447 A | 8/1996 | Skarbo |
| 5,559,800 A | 9/1996 | Mousseau |
| 5,561,604 A | 10/1996 | Buckley |
| 5,572,005 A | 11/1996 | Hamilton |
| 5,583,965 A | 12/1996 | Douma |
| 5,584,054 A | 12/1996 | Tyneski |
| 5,587,735 A | 12/1996 | Ishida |
| 5,592,529 A | 1/1997 | Linsker |
| 5,610,910 A | 3/1997 | Focsaneanu |
| 5,612,997 A | 3/1997 | Vallelonga, Sr. |
| 5,615,252 A | 3/1997 | Sizer, II |
| 5,619,684 A | 4/1997 | Goodwin |
| 5,628,005 A | 5/1997 | Hurvig |
| 5,629,978 A | 5/1997 | Blumhardt |
| 5,642,348 A | 6/1997 | Barzegar |
| 5,644,628 A | 7/1997 | Schwarzer |
| 5,652,789 A | 7/1997 | Miner |
| 5,671,267 A | 9/1997 | August |
| 5,682,195 A | 10/1997 | Hendricks |
| 5,684,918 A | 11/1997 | Abecassis |
| 5,689,501 A | 11/1997 | Takase |
| 5,689,553 A | 11/1997 | Ahuja |
| 5,689,555 A | 11/1997 | Sonnenberg |
| 5,696,815 A | 12/1997 | Smyk |
| 5,706,342 A | 1/1998 | Baeder |
| 5,708,961 A | 1/1998 | Hylton |
| 5,712,907 A | 1/1998 | Wegner |
| 5,724,355 A | 3/1998 | Bruno |
| 5,724,411 A | 3/1998 | Eisdorfer |
| 5,724,412 A | 3/1998 | Srinivasan |
| 5,737,333 A | 4/1998 | Civanlar |
| 5,740,230 A | 4/1998 | Vaudreuil |
| 5,740,231 A | 4/1998 | Cohn |
| 5,742,596 A | 4/1998 | Baratz |
| 5,742,905 A | 4/1998 | Pepe |
| 5,745,556 A | 4/1998 | Ronen |
| 5,751,706 A | 5/1998 | Land |
| 5,751,760 A | 5/1998 | Fuller |
| 5,754,775 A | 5/1998 | Adamson |
| 5,764,752 A | 6/1998 | Waite |
| 5,768,513 A | 6/1998 | Kuthyar |
| 5,778,173 A | 7/1998 | Apte |
| 5,784,444 A | 7/1998 | Snyder |
| 5,790,806 A | 8/1998 | Koperda |
| 5,793,413 A | 8/1998 | Hylton |
| 5,796,394 A | 8/1998 | Wicks |
| 5,796,424 A | 8/1998 | Ely |
| 5,796,718 A | 8/1998 | Caterisano |
| 5,796,952 A | 8/1998 | Davis |
| 5,802,045 A | 9/1998 | Kos |
| 5,802,160 A | 9/1998 | Kugell |
| 5,802,510 A | 9/1998 | Jones |
| 5,805,587 A | 9/1998 | Norris |
| 5,809,128 A | 9/1998 | McMullin |
| 5,812,786 A | 9/1998 | Seazholtz |
| 5,825,829 A | 10/1998 | Borazjani |
| 5,825,862 A | 10/1998 | Voit |
| 5,832,221 A | 11/1998 | Jones |
| 5,850,340 A | 12/1998 | York |
| 5,850,429 A | 12/1998 | Joyce |
| 5,859,895 A | 1/1999 | Pomp |
| 5,859,902 A | 1/1999 | Freedman |
| 5,867,495 A | 2/1999 | Elliott |
| 5,870,565 A | 2/1999 | Glitho |
| 5,883,677 A | 3/1999 | Hofmann |
| 5,883,942 A | 3/1999 | Lim |
| 5,887,259 A | 3/1999 | Zicker |
| 5,894,504 A | 4/1999 | Alfred |
| 5,896,444 A | 4/1999 | Perlman |
| 5,898,668 A | 4/1999 | Shaffer |
| 5,898,780 A | 4/1999 | Liu |
| 5,907,547 A | 5/1999 | Foladare |
| 5,907,598 A | 5/1999 | Mandalia |
| 5,907,604 A | 5/1999 | Hsu |
| 5,912,952 A | 6/1999 | Brendzel |
| 5,912,962 A | 6/1999 | Bosco |
| 5,916,302 A | 6/1999 | Dunn |
| 5,917,624 A | 6/1999 | Wagner |
| 5,920,705 A | 7/1999 | Lyon |
| 5,923,731 A | 7/1999 | McClure |
| 5,928,335 A | 7/1999 | Morita |
| 5,930,340 A | 7/1999 | Bell |
| 5,944,795 A | 8/1999 | Civanlar |
| 5,946,381 A | 8/1999 | Danne |
| 5,946,386 A | 8/1999 | Rogers |
| 5,956,717 A | 9/1999 | Kraay |
| 5,970,072 A | 10/1999 | Gammenthaler, Jr. |
| 5,970,473 A | 10/1999 | Gerszberg |
| 5,978,470 A | 11/1999 | Shaffer |
| 5,982,774 A | 11/1999 | Foladare |
| 5,982,784 A | 11/1999 | Bell |
| 5,987,100 A | 11/1999 | Fortman |
| 5,987,508 A | 11/1999 | Agraharam |
| 5,991,380 A | 11/1999 | Bruno |
| 5,995,606 A | 11/1999 | Civanlar |
| 5,999,525 A | 12/1999 | Krishnaswamy |
| 5,999,598 A | 12/1999 | Henrick |
| 5,999,602 A | 12/1999 | Yang |
| 5,999,612 A | 12/1999 | Dunn |
| 6,005,861 A | 12/1999 | Humpleman |
| 6,005,873 A | 12/1999 | Amit |
| 6,006,253 A | 12/1999 | Kumar |
| 6,009,410 A | 12/1999 | LeMole |
| 6,011,909 A | 1/2000 | Newlin |
| 6,014,427 A | 1/2000 | Hanson |
| 6,016,336 A | 1/2000 | Hanson |
| 6,020,915 A | 2/2000 | Bruno |
| 6,023,724 A | 2/2000 | Bhatia |
| 6,026,441 A | 2/2000 | Ronen |
| 6,028,848 A | 2/2000 | Bhatia |
| 6,028,867 A | 2/2000 | Rawson |
| 6,031,896 A | 2/2000 | Gardell |
| 6,031,899 A | 2/2000 | Wu |
| 6,031,906 A | 2/2000 | Rao |
| 6,038,233 A | 3/2000 | Hamamoto |
| 6,044,403 A | 3/2000 | Gerszberg |
| 6,047,063 A | 4/2000 | Perry |
| 6,049,594 A | 4/2000 | Furman |
| 6,052,444 A | 4/2000 | Ferry |
| 6,052,594 A | 4/2000 | Chuang |
| 6,052,725 A | 4/2000 | McCann |
| 6,061,434 A | 5/2000 | Corbett |
| 6,069,879 A | 5/2000 | Chatter |
| 6,075,796 A | 6/2000 | Katseff |
| 6,078,886 A | 6/2000 | Dragosh |
| 6,084,292 A | 7/2000 | Shinohara |
| 6,085,231 A | 7/2000 | Agraharam |
| 6,088,368 A | 7/2000 | Rubinstain |
| 6,101,246 A | 8/2000 | Heinmiller |
| 6,104,704 A | 8/2000 | Buhler |
| 6,104,800 A | 8/2000 | Benson |
| 6,108,330 A | 8/2000 | Bhatia |
| 6,115,393 A | 9/2000 | Engel |
| 6,118,432 A | 9/2000 | Kotorov |
| 6,118,768 A | 9/2000 | Bhatia |
| 6,118,778 A | 9/2000 | Amin |
| 6,118,784 A | 9/2000 | Tsuchiya |
| 6,122,357 A | 9/2000 | Farris |
| 6,125,376 A | 9/2000 | Klarlund |
| 6,128,304 A | 10/2000 | Gardell |
| 6,134,235 A | 10/2000 | Goldman |
| 6,137,870 A | 10/2000 | Scherer |
| 6,138,100 A | 10/2000 | Dutton |
| 6,144,401 A | 11/2000 | Casement |
| 6,144,667 A | 11/2000 | Doshi |
| 6,148,067 A | 11/2000 | Leipow |
| 6,154,531 A | 11/2000 | Clapper |
| 6,160,880 A | 12/2000 | Allen |

| | | | | | | |
|---|---|---|---|---|---|---|
| 6,163,531 | A | 12/2000 | Kumar | 6,560,222 B1 | 5/2003 | Pounds |
| 6,167,043 | A | 12/2000 | Frantz | 6,570,855 B1 | 5/2003 | Kung |
| 6,173,250 | B1 | 1/2001 | Jong | 6,570,974 B1 | 5/2003 | Gerszberg |
| 6,175,619 | B1 | 1/2001 | DeSimone | 6,590,867 B1 | 7/2003 | Ash |
| 6,185,288 | B1 | 2/2001 | Wong | 6,633,635 B2 | 10/2003 | Kung |
| 6,188,756 | B1 | 2/2001 | Mashinsky | 6,633,848 B1 | 10/2003 | Johnson |
| 6,192,116 | B1 | 2/2001 | Mayak | 6,640,239 B1 | 10/2003 | Gidwani |
| 6,201,797 | B1 | 3/2001 | Leuca | 6,650,901 B1 * | 11/2003 | Schuster et al. ............ 455/456.1 |
| 6,229,810 | B1 | 5/2001 | Gerszberg | 6,687,360 B2 | 2/2004 | Kung |
| 6,229,887 | B1 | 5/2001 | Albers | 6,690,675 B1 | 2/2004 | Kung |
| 6,233,235 | B1 | 5/2001 | Burke | 6,744,767 B1 | 6/2004 | Chiu |
| 6,233,313 | B1 | 5/2001 | Farris | 6,771,742 B2 * | 8/2004 | Mathis et al. .................... 379/45 |
| 6,243,388 | B1 | 6/2001 | Mussman | 6,775,267 B1 | 8/2004 | Kung |
| 6,243,445 | B1 | 6/2001 | Begeja | 6,826,173 B1 | 11/2004 | Kung |
| 6,252,952 | B1 | 6/2001 | Kung | 6,836,476 B1 * | 12/2004 | Dunn et al. .................... 370/352 |
| 6,262,979 | B1 | 7/2001 | Anderson | 6,940,950 B1 | 9/2005 | Dickinson |
| 6,263,065 | B1 | 7/2001 | Durinovic-Johri | 7,006,614 B2 | 2/2006 | Feinberg |
| 6,263,503 | B1 | 7/2001 | Margulis | 7,027,564 B2 * | 4/2006 | James .............................. 379/37 |
| 6,266,340 | B1 | 7/2001 | Pickett | 7,042,985 B1 * | 5/2006 | Wright ............................ 379/45 |
| 6,266,405 | B1 | 7/2001 | Madour | 7,054,313 B1 | 5/2006 | Gerszberg |
| 6,285,750 | B1 | 9/2001 | Brachman | 7,099,443 B2 | 8/2006 | Phillips |
| 6,289,025 | B1 | 9/2001 | Pang | 7,110,395 B1 * | 9/2006 | Blair ............................. 370/356 |
| 6,292,553 | B1 | 9/2001 | Fellingham | 7,149,499 B1 * | 12/2006 | Oran et al. ................. 455/404.2 |
| 6,295,298 | B1 | 9/2001 | Hrastar | 7,180,988 B2 | 2/2007 | Phillips |
| 6,298,120 | B1 | 10/2001 | Civanlar | 7,181,401 B2 | 2/2007 | Johnson |
| 6,300,947 | B1 | 10/2001 | Kanevsky | 7,239,698 B2 | 7/2007 | Phillips |
| 6,304,566 | B1 | 10/2001 | Schessel | 7,257,387 B2 * | 8/2007 | Laliberte .................... 455/404.1 |
| 6,304,573 | B1 | 10/2001 | Hicks, III | 7,260,186 B2 * | 8/2007 | Zhu et al. ........................ 379/45 |
| 6,304,636 | B1 | 10/2001 | Goldberg | 7,379,436 B2 * | 5/2008 | Jiang ............................. 370/328 |
| 6,310,889 | B1 | 10/2001 | Parsons | 7,379,455 B2 | 5/2008 | Pickett |
| 6,317,684 | B1 | 11/2001 | Roeseler | 7,391,761 B1 | 6/2008 | Ruckart |
| 6,317,884 | B1 | 11/2001 | Eames | 7,453,990 B2 * | 11/2008 | Welenson et al. ................ 379/45 |
| 6,324,279 | B1 | 11/2001 | Kalmanek, Jr. | 7,474,742 B2 | 1/2009 | Cook |
| 6,327,346 | B1 | 12/2001 | Infosino | 7,496,360 B2 * | 2/2009 | Sindhwani et al. ......... 455/422.1 |
| 6,332,139 | B1 | 12/2001 | Kaneko | 7,508,928 B1 * | 3/2009 | Everson et al. ........... 379/221.01 |
| 6,333,931 | B1 | 12/2001 | LaPier | 7,573,988 B2 * | 8/2009 | Lee et al. .................... 379/88.17 |
| 6,339,594 | B1 | 1/2002 | Civanlar | 7,580,405 B2 * | 8/2009 | Laliberte ...................... 370/389 |
| 6,343,074 | B1 | 1/2002 | Pickett | 7,586,902 B2 * | 9/2009 | Epley ............................ 370/352 |
| 6,343,115 | B1 | 1/2002 | Foladare | 7,746,905 B2 | 6/2010 | Binder |
| 6,347,075 | B1 | 2/2002 | Barzegar | 2001/0004382 A1 | 6/2001 | Van Wonterghem |
| 6,351,464 | B1 | 2/2002 | Galvin | 2002/0013941 A1 | 1/2002 | Ward, III |
| 6,353,611 | B1 | 3/2002 | Norris | 2002/0056112 A1 | 5/2002 | Dureau |
| 6,356,546 | B1 | 3/2002 | Beshai | 2002/0065935 A1 | 5/2002 | Koperda |
| 6,359,881 | B1 | 3/2002 | Gerszberg | 2003/0081377 A1 | 5/2003 | Lin |
| 6,363,411 | B1 | 3/2002 | Dugan | 2003/0204393 A1 | 10/2003 | Czerwiec |
| 6,366,578 | B1 | 4/2002 | Johnson | 2003/0214939 A1 | 11/2003 | Eldumiati |
| 6,373,817 | B1 | 4/2002 | Kung | 2004/0001479 A1 | 1/2004 | Pounds |
| 6,374,124 | B1 | 4/2002 | Slabinski | 2004/0001501 A1 | 1/2004 | Delveaux |
| 6,385,202 | B1 | 5/2002 | Katseff | 2004/0057425 A1 * | 3/2004 | Brouwer et al. ............... 370/352 |
| 6,385,646 | B1 | 5/2002 | Brown | 2004/0073597 A1 | 4/2004 | Caveney |
| 6,389,114 | B1 | 5/2002 | Dowens | 2004/0125819 A1 | 7/2004 | Binder |
| 6,393,014 | B1 | 5/2002 | Daly | 2004/0140928 A1 | 7/2004 | Cleghorn |
| 6,393,017 | B1 | 5/2002 | Galvin | 2004/0151168 A1 | 8/2004 | Phillips |
| 6,404,735 | B1 | 6/2002 | Beshai | 2004/0151290 A1 | 8/2004 | Magarasevic |
| 6,418,139 | B1 | 7/2002 | Akhtar | 2004/0153577 A1 | 8/2004 | Phillips |
| 6,418,146 | B1 | 7/2002 | Miloslavsky | 2004/0176085 A1 | 9/2004 | Phillips |
| 6,421,425 | B1 | 7/2002 | Bossi | 2005/0083912 A1 * | 4/2005 | Afshar et al. ................. 370/352 |
| 6,424,646 | B1 | 7/2002 | Gerszberg | 2005/0141431 A1 | 6/2005 | Caveney |
| 6,425,131 | B2 | 7/2002 | Crandall | 2005/0144645 A1 | 6/2005 | Casey |
| 6,437,692 | B1 | 8/2002 | Petite | 2005/0213565 A1 * | 9/2005 | Barclay et al. ................ 370/352 |
| 6,438,222 | B1 | 8/2002 | Burg | 2005/0213716 A1 * | 9/2005 | Zhu et al. ........................ 379/45 |
| 6,438,223 | B1 | 8/2002 | Eskafi | 2005/0243973 A1 * | 11/2005 | Laliberte ........................ 379/37 |
| 6,442,266 | B1 | 8/2002 | Wu | 2006/0120517 A1 | 6/2006 | Moon et al. ..................... 379/45 |
| 6,449,766 | B1 | 9/2002 | Fleming | 2006/0188073 A1 * | 8/2006 | Wright ............................ 379/45 |
| 6,452,923 | B1 | 9/2002 | Gerszberg | 2006/0293024 A1 | 12/2006 | Benco |
| 6,456,699 | B1 | 9/2002 | Burg | 2007/0013516 A1 | 1/2007 | Freitag |
| 6,459,913 | B2 | 10/2002 | Cloutier | 2007/0092070 A1 | 4/2007 | Croy |
| 6,467,090 | B1 | 10/2002 | Brodigan | 2007/0147345 A1 | 6/2007 | Lowmaster |
| 6,480,748 | B1 | 11/2002 | Gerszberg | 2007/0259645 A1 * | 11/2007 | Laliberte .................... 455/404.2 |
| 6,490,274 | B1 | 12/2002 | Kim | 2009/0274145 A1 * | 11/2009 | Laliberte ...................... 370/352 |
| 6,493,324 | B1 | 12/2002 | Truetken | 2010/0029246 A1 * | 2/2010 | Binning ...................... 455/404.2 |
| 6,501,740 | B1 | 12/2002 | Sun | | | |
| 6,505,348 | B1 | 1/2003 | Knowles | FOREIGN PATENT DOCUMENTS | | |
| 6,510,152 | B1 | 1/2003 | Gerszberg | EP | 0758175 | 2/1997 |
| 6,519,246 | B1 | 2/2003 | Strahs | EP | 0848560 | 6/1997 |
| 6,519,249 | B1 | 2/2003 | Bennefeld | EP | 0794643 | 9/1997 |
| 6,522,628 | B1 | 2/2003 | Patel | EP | 0800325 | 10/1997 |
| 6,532,286 | B1 | 3/2003 | Burg | EP | 0856981 | 8/1998 |
| 6,542,500 | B1 | 4/2003 | Gerszberg | EP | 0905959 | 3/1999 |

| | | |
|---|---|---|
| WO | 9518501 | 7/1995 |
| WO | 9714238 | 4/1997 |
| WO | 9716007 | 5/1997 |
| WO | 9737483 | 10/1997 |
| WO | 9746073 | 12/1997 |
| WO | 9747118 | 12/1997 |
| WO | 9747119 | 12/1997 |
| WO | 9747127 | 12/1997 |
| WO | 9801985 | 1/1998 |
| WO | 9807266 | 2/1998 |
| WO | 9819240 | 5/1998 |
| WO | 9819448 | 5/1998 |
| WO | 9819471 | 5/1998 |
| WO | 9824224 | 6/1998 |
| WO | 9830002 | 7/1998 |
| WO | 9836551 | 8/1998 |
| WO | 9841032 | 9/1998 |
| WO | 9851063 | 11/1998 |
| WO | 9852332 | 11/1998 |
| WO | 9852339 | 11/1998 |
| WO | 9853617 | 11/1998 |
| WO | 9854871 | 12/1998 |
| WO | 9914924 | 3/1999 |
| WO | 9916201 | 4/1999 |
| WO | 9944352 | 9/1999 |
| WO | 9953719 | 10/1999 |

OTHER PUBLICATIONS

Rupp et al., "Index: A Platform for Determining How People Value the Quality of their Internet Access", Proceedings of the Sixth IEEE/IFIP International Workshop on Quality of Service, Napa CA, pp. 85-90, May 1998.

Holliday, Clifford R., "The Residential Gateway", IEEE Spectrum Magazine; May 1997, pp. 29-31.

Meggers, J. et al., "Providing Video Conferencing for the Mobile User", Local Computer Networks, Proceedings 21st IEEE Conference, 1996, pp. 526-534.

Umehira, M., et al. "Wireless and IP Integrated System Architectures for Broadband Mobile Multimedia Services", Wireless Communications and Networking Conference, WCNC, 1999 IEEE, 1999, pp. 593-597.

Albrecht, Markus, et al., "IP Services Over Bluetooth: Leading the Way to a New Mobility", IEEE 1999, 10 pages.

Perkins, Charles E., "Mobile-IP, Ad-Hoc Networking, and Nomadicity", IEEE 1996, pp. 472-476.

Jacobs, Stuart, "Security of Current Mobile IP Solutions", IEEE 1997, pp. 1122-1128.

Deering, S., Internet RFC/STD/FYI/BCP Archives, Internet Protocol, Version 6 specification, Dec. 1995, Xerox PARC, 38 pages.

* cited by examiner

METHOD AND SYSTEM FOR LOCATING A VOICE OVER INTERNET PROTOCOL (VOIP) DEVICE CONNECTED TO A NETWORK

BACKGROUND OF THE INVENTION

1. Field of the Invention

The present invention relates to methods and systems for locating a device connected to a network, such as to locate a Voice Over Internet Protocol (VoIP) device.

2. Background Art

Voice Over Internet Protocol (VoIP) or Internet Protocol (IP) Telephony is a technology that allows a user to make a telephone call over the Internet or a dedicated network in IP packets, instead of over dedicated voice transmission lines.

With a VoIP service, it is possible for a user to move their VoIP phone to virtually any IP network and have the ability to make and receive calls at their home phone number, which is commonly referred to as a personal telephone number (TN). This is, in fact, one of the benefits of VoIP service, whereby for example a user can take their VoIP phone with them to a hotel with broadband Internet service and have their home phone ring in their hotel room. By contrast, traditional telephone service is tied to a specific location by nature of the circuit-based telephone network.

The problem with this new capability of VoIP, however, is that the traditional approach utilized by emergency services personnel to locate an individual in the event of an emergency 911 call no longer works reliably in VoIP systems. For example, a VoIP customer's location is recorded as their billing address and all calls originating from the customer's VoIP phone are assumed to be originating from the home address of the customer. If the customer takes the VoIP phone to a second location, such as a shore vacation home for the weekend, and a life-threatening medical emergency prompts the customer to dial 911, then the 911 call would be routed to the Public Safety Answering Point (PSAP) in the area of the customer's billing address, not their current address at the shore vacation residence.

Some VoIP service providers have attempted to solve this by routing 911 calls on their VoIP network to an intermediate dispatch center that determines which PSAP to route the call to. The intermediate dispatch center includes an operator for answering the emergency 911 call. The operator interrogates the caller to determine their location and then routes the call to the PSAP in the location of the caller. However, this approach can add extra time to the emergency response that can be critical to safety. Moreover, it is a labor intensive and relatively expensive for the service provider to maintain.

SUMMARY OF THE INVENTION

It is, therefore, an object of the present invention to provide a method and system for locating a VoIP customer.

The present invention contemplates a number of features for locating a VoIP customer, including a processing unit configured for operation on a network used to support VoIP calls. The processing unit preferably includes a processor and a memory configured for locating a VoIP customer by locating a VoIP device used by the customer.

The processing unit is configured to determine a current network address for the VoIP device on the network. Once the current network address is determined, the processing unit is configured to locate a user profile stored on the processing unit that is associated with the VoIP device. The user profile includes at least one physical address associated with a network address so that the processing unit can determine if the current network address matches with any of the network addresses in the user profile. The processing unit then determines a location of the VoIP device to be at the physical address associated with the network address that matches the current network address of the VoIP device.

The processing unit can be configured to provide the location of the VoIP device to a public safety answering point (PSAP) in the event of an emergency, such as if the VoIP customer using the VoIP device is making an emergency call.

One advantage of the present invention is that it permits emergency services to be provided without maintaining an emergency services dispatch center. This permits emergency calls to be routed to the appropriate authorities more quickly, leading to increased safety and security for customers, lower cost for the service provider, and better VoIP service features relative to competitors.

Another advantage of the present invention is that it is IP-network-based such that it can encompass other VoIP devices beyond telephones, such as instant messaging clients, and other real-time communication tools (text, audio, and/or video-based). In this manner, these non-telephone items can be used to make emergency calls over the VoIP system and have the location of the calling party determined.

DETAILED DESCRIPTION OF THE PREFERRED EMBODIMENT(S)

Figure 1:
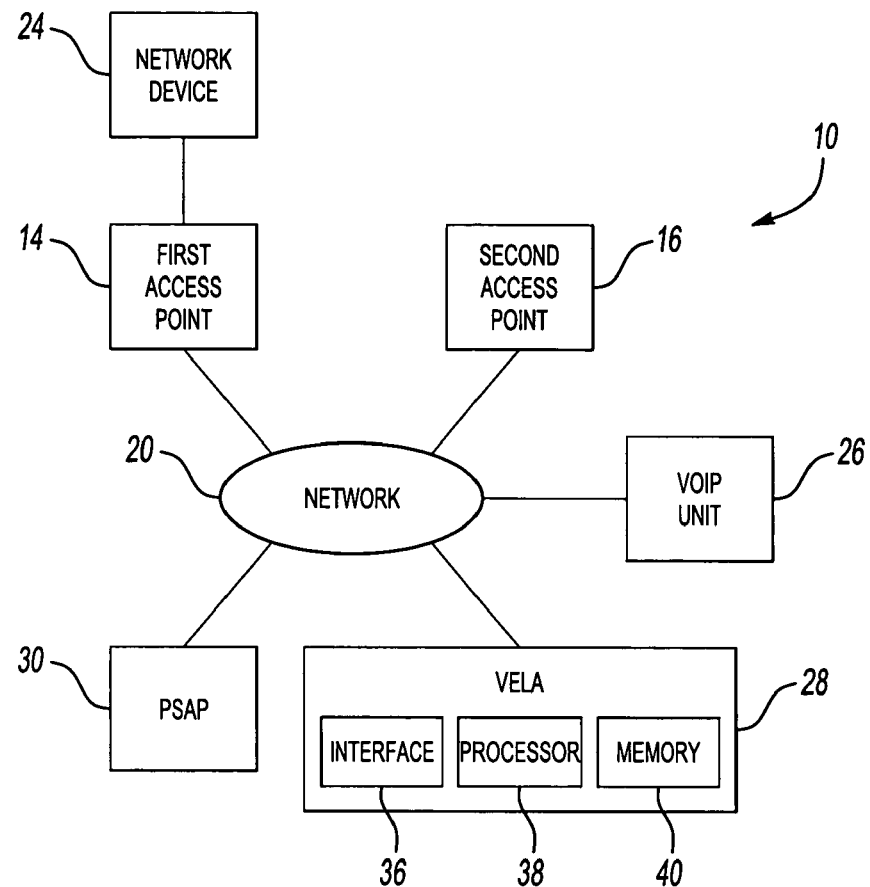
FIG. 1 illustrates a network system in accordance with one aspect of the present invention.

FIG. 1 illustrates a network system 10 in accordance with one aspect of the present invention. The network system 10 generally includes a first access point 14, a second access point 16, and a network 20 such that data and signals communicated over the network 20 are accessible by connected a network device 24 to one of the access points 14 and 16.

The network device 24 can be any type of computer or other item that is capable of network communications, such as computers, servers, personal digital assistants (PDAs), and the like. In particular, the present invention contemplates that the network device 24 is a Voice Over Internet Protocol (VoIP) device that is configured to make VoIP telephone calls over the network 20. In support thereof, the system 10 further includes a VoIP unit 26, a VoIP emergency location application (VELA) or processing unit 28, and a Public Safety Answering Point (PSAP) 30.

The VoIP device 24 can relate to any device that is capable of making VoIP calls. Such devices can include a number of features, including a telephone with an analog terminal adapter (ATA), a software-based Session Initiation Protocol (SIP) phone, a stand-alone or embedded Message Transfer Agent (MTA) device, a videophone (whether hardware-based or software-based), a wireless phone (generally cellular phones), a Personal Digital Assistant (PDA) with VoIP software, and the like. Preferably, the VoIP device 24 includes a unique personal telephone number that allows the device 24 to receive VoIP telephone calls anytime that it is connected to the network 20.

The first and second access points 14 and 16 are nodes or other features that are configured to connect the network device 24 to the network 20. The system 10 shown in FIG. 1 only indicates two access points 14 and 16, but it is contemplated that the system 10 may include any number of access points in any number of geographical areas. Preferably, a network address, such as an IP address, is associated with each access point to identify its location on the network 20.

The network 20 generally relates to any configuration that permits network communication and VoIP calls, such as through the exchange or transfer of electronic signals and packets over private IP networks, the Internet, or public switching telephone network (PSTN). It can include servers, databases, softswitches, and the like which function to enable, route, and/or control voice, video, and text-based communications and can include items generally described as VoIP softswitches, PacketCable Call Management Servers (CMS), VoIP call servers, IP Public Branch Exchanges (PBXs), SIP Proxy servers, SIP Registrar servers, SIP switches, and the like.

The PSAP 30 generally relates to a dispatch office that routes incoming 911 calls, or directly dispatches a public service department, such as a fire, police, or other emergency department. Preferably, the PSAP can receive calls over a PSTN and electronically over the Internet or other IP networks, or through other communications means, such as satellite or other wireless communication. In particular, the PSAP may be an enhanced 911 (E911) dispatch center that is capable of exchanging signals through IP-network-based applications, such as instant messaging clients, real-time communication tools (text, audio, and/or video-based), and other non-telephone clients.

The VELA 28 is configured in accordance with the present invention to communicate with the network 20 and to determine the location of a user on the network 20 based on a location of the network device 24, such as by determining whether the network device 24 is at the first access point 14 or the second access point 16. This can be advantageous for locating the user in the event of an emergency, such as when the user makes an emergency 911 call using a VoIP device from one of the access points 14 and 16.

The VELA 28 preferably includes an interface 36 that is configured for exchanging signals and packets with the network 20, such as for communicating with the VoIP device 24 and/or the PSAP 30 by exchanging signals and packets over the network to one or more of the access points 14 and 16. Preferably, the interface 36 includes an Interactive Voice Response (IVR) unit, Text to Speech (TTS), and/or a Speech to Text (STT) unit, which enables the interface 36 to convert speech received by the interface to electronic signals and to similarly output electronic signals to speech, such as to communicate with the user through the VoIP device 24. In particular, the interface 36 is able to output and receive voice and touch-tone signals to and from the VoIP device 24 so that the VELA 28 can communicate verbally with the user through a dialogue and record the responses of the user thereto.

The VELA 28 can be configured to route calls to the PSAP 30 via the PSTN using legacy methods of call networking/termination, to route calls via the public Internet or private Internet Protocol (IP) peering point, and to route calls to multiple interfaces of the PSAP 30, such as a primary interface preference and one or more secondary interfaces, based upon the PSAP's capabilities and preferences or the service provider's preferences. In addition, the VELA 28 can contact the secondary interface if the primary interface is not reachable for some reason, such as network congestion, network failure, etc.

The VELA 28 preferably includes a processor 38 and a memory 40 for controlling operation of the interface 36 and for executing other applications and strategies, which preferably includes a 911 call routing/query response application for transferring 911 calls from the access point to the PSAP associated with a location of the user, as described below in more detail. The VELA 28 can include other optional features, such as a web interface application configured to enable user location configuration, selection, and/or confirmation, and a video/graphic interface application configured to enable user location configuration, selection, and/or confirmation via a textual or graphical interface on a particular type of device (cellular phone screen, video phone screen, etc.).

The VELA 28 can optionally detect the type of network device 24 based upon information derived from its connection to the network 20. When one of these devices with graphical capabilities is used, the VELA 28 can be configured to, instead of initiating an out-dial, initiate a multimedia message to the user's device or present that device with a graphical interface. The user can respond to that message by pressing buttons on their device, clicking on the interface, or otherwise interacting with the graphical user interface or multimedia message. This interface may take several forms in the future but may be HTML-based, XML-based, or VoiceXML-based using today's technologies.

The VoIP unit 26 is a processing unit configured to permit and/or control VoIP communications. It can include any number of features, including memory and processors (not shown) that communicate with the network 20 for executing a VoIP application, such as a VoIP telephone call. In general, the system is configured to route calls to the VoIP device 24 based on the telephone number assigned to it so that a user can receive calls on the telephony device at any access point 14 and 16 on the network 20 that is in communication with the VoIP unit 26.

The system 10 shown in FIG. 1 is only provided for exemplary purposes and is not intended to limit the scope of the present invention. Rather, the present invention contemplates that the system 10 may include more or less features than those shown in FIG. 1. In particular, the VoIP device 24 and each of the access points 14 and 16 are illustrated as separate items, however, the present invention contemplates that an access point may be integrated into the VoIP device 24 and, in addition, that these two items may be further integrated into a fixed or portable communications and/or computing device.

Figure 2:
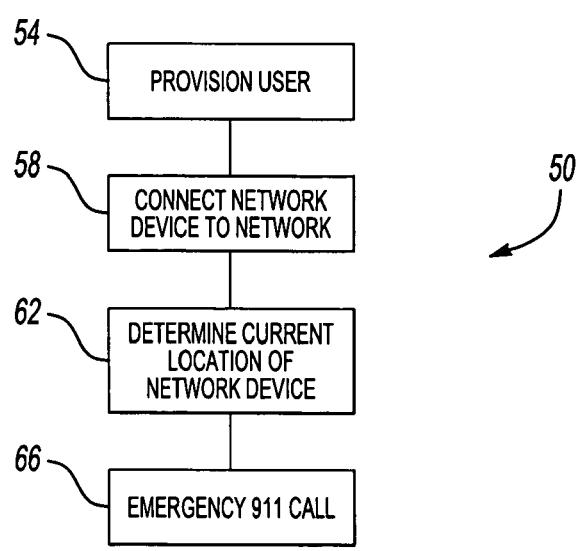
FIG. 2 illustrates a flowchart of a method for determining a location of a device connected to a network in accordance with one aspect of the present invention.

FIG. 2 illustrates a flowchart 50 of a method for locating the network device (VoIP device) when it is connected to a network. The method is advantageous in locating the user in the event of an emergency 911 call from the network device 24 and for routing the emergency 911 call to the PSAP 30 associated with the location of the user.

Block 54 relates to provisioning a user for operation with the VELA. The provisioning can include any number of features, and generally comprises creating and storing a user profile in the database of the VELA. The user profile can be created by an operator inputting the user's information into the VELA, by the user inputting the information themselves, such as through a graphical user interface (GUI) or web page, and/or automatically by querying the VoIP device when it is connected to the network, which is advantageous for determining the IP address and network hops associated with the access point to which the user connects the VoIP device, as it may be difficult for the user or operator to input this information. Optionally, block 54 can be skipped and the user profile can be created dynamically upon connecting the VoIP device to one of the access points.

The user profile preferably identifies the user with a telephone number and includes additional location information, such as a physical address (city, state, zip code, apartment number, etc.) and network address (IP address and network hops) for the access point from which the user intends to connect to the network for making VoIP telephone calls. The network address is associated with the physical address as the physical addresses are more unique than the network addresses. This is because the network addresses may not, by nature of them being shared across what may be a small or large area and one or many people, be at the same location as the user, or at least within a small enough area relative to the access point associated with the user that emergency personnel would be able to locate the user in an emergency. Network addresses may also be dynamically assigned, such that the same physical address will show up at different network addresses over time. The physical location indicates where the user is located when connecting to the access point associated with the current network address so that the user can be located in the event of an emergency 911 call.

Multiple entries can be made in the user profile if the user intends to use the VoIP device at multiple locations on the network. Preferably, a nickname or another unique identifier is provided if the user profile includes multiple residences or locations for the user so that each location can be easily distinguished. For example, the user may intend to use the VoIP device at home, at a beach vacation home, and at work. In which case, the user profile is provisioned with physical and network address for each of the locations.

Block 58 relates to connecting the VoIP device to the network, such as if the user intends to make a call or if the user is merely connecting the device to the network to receive calls, which may occur in the act of turning on or plugging in a device. Upon connecting to the network or in response to a message from the VELA, the VoIP device sends a message to the VELA that includes the telephone number assigned with the VoIP device. The VELA analyzes the message to determine the IP address of the access point to which the VoIP device is connected and to determine any network hops between the access point and the VELA, such as by tracerouting the IP address to determine the network hops. This information is then stored in the memory of the VELA for use in determining a location of the user. Depending upon the results of this transaction, the user may be queried by the VELA to confirm his/her correct physical location, select from a list of locations which may or may not be sorted based upon the VELA's best estimate of the location, or choose to configure a new location in the VELA.

Block 62 relates to determining a current location for the user based on the telephone number and network address determined in block 58. Initially, the VELA uses the telephone number to search the database for a user profile that includes the same telephone number, i.e. to match a user profile with the telephone number. Once the user profile is located, the VELA compares the network address determined in block 58 with the network addresses in the user profile. If one of the network addresses matches, the VELA pulls the associated physical address and controls the interface to contact the user, such as through an out-going call or other message to the user and/or their telephony device. The user is then asked whether the physical address corresponds with the current location of the user. If the user to determine their location. The location is denied, for example, if there is an error during the inputting of the physical location to the user profile, if the user intends to be at a different location but maintains the use of the same access point, and if the user failed to provide a physical address in the user profile. In response to the denial, the VELA interrogates the user further to determine the physical address that they desire to associate with the network address. This information is then stored in the user profile so that it is available the next time the user connects to the network and the current location of the user is noted.

If none of the network addresses in the user profile match the network address determined in block 58, then the user is in an unknown or new location. In which case, the VELA controls the interface to contact the user, such as through an out-going call or message, to create an entry for the unknown network ID. The entry is similar to those described above, in that the user is questioned by the VELA to determine a physical address and nickname for association with the unknown network address. Once the entry is complete, the physical address associated with the new entry is added to the user's profile and noted as the current location of the user.

The dialogue to determine the location of the user, as described above, can take any number of forms. For example, the VELA can be configured to provide the following sequential dialogue:

1. This is the 911 Service Application calling. We were unable to automatically determine your location. Please tell us where your phone is connected so that we can connect your call appropriately in case you have an emergency.
    a. Press 1 now if you are calling from "Home."
        i. 1 pressed, You are calling from "Home."
        ii. If this is incorrect, press # to go back to the main menu.
        iii. If this is correct, press 1 now or hangup.
        i. 1 pressed, You are calling from "Home."
        ii. If this is incorrect, press # to go back to the main menu.
        iii. If this is correct, press 1 now or hangup.
        iv. If the address of this location has changed, press 2 now to record the new address.
    b. Press 2 now if you are calling from "Beach House."
        i. 2 pressed, You are calling from "Beach House."
        ii. If this is incorrect, press # to go back to the main menu.
        iii. If this is correct, press 1 now or hangup.
        iv. If the address of this location has changed, press 2 now to record the new address. (Speech to Text engine invoked.)
    c. Press 3 now if you are calling from "Work."
        i. 3 pressed, You are calling from "Work."
        ii. If this is incorrect, press # to go back to the main menu.
        iii. If this is correct, press 1 now or hangup.
        iv. If the address of this location has changed, press 2 now to record the new address.
    d. Press 4 now if you are calling from a new location.
        i. We need a nickname for this location, such as "Home" or "Beach House." Please speak the nickname of your location now.
        ii. We need a house number for this location. Please speak the number now or use your keypad.
        iii. We need a street for this location. Please speak the street now.
        iv. We need a city for this location. Please speak the city now.
        v. We need a State for this location. Please speak the State now.
        vi. We need a ZIP Code for this location. Please speak the ZIP Code now or use your keypad. (The ZIP Code could be used to avoid having to ask for the city and state, if desired.)

The VELA can also be configured with a location matching application (LMA) to facilitate locating the user. In general, the LMA is a process of matching network address determined upon connection of the VoIP device to the network addresses in the user profile when the network addresses fails to exactly match, such as if the user is at the same physical location but using a different access point or an access point the utilizes multiple network address. The VELA utilizes the LMA to predictively attempt to match the network address (location of the user) by executing the following logical operations:

1. Does the current network address detected match a network address in the user profile? If so, match the current network address to the corresponding network address in the user profile and dialogue with the user to determine that the physical address associated therewith corresponds with the current location of the user, if not, proceed to next step.
2. VELA performs a traceroute on the current network address and records every hop in the traceroute. Does the first hop of the traceroute match any of the hops (first or otherwise) for the other network addresses in the user profile. If so, match the current network address to the corresponding network address in the user profile and dialogue with the user to determine the physical address associated therewith corresponds with the current location of the user, if not, proceed to next step.
3. Does the second hop of the traceroute match any of the hops in the Location Database for the user. If so, match the current network address to the corresponding network address in the user profile and dialogue with the user to determine the physical address associated therewith corresponds with the current location of the user, if not, proceed to next step with the remainder of the hops recorded by the trace route.

As described above, the LMA utilizes intermediate network hops for the current network address of the user to locate the physical address of the user. This can be advantageous to narrow down a geographical area in which the user is located. For example, the physical address of the user can be approximated by the intermediate network hops if they match with any of the intermediate network hops in the user profile.

Block 66 relates to the user making an emergency 911 call. The emergency call is recognized by the VELA and routed to the appropriate PSAP based upon the location of the user determined in block 62. Each time the user connects their VoIP device to another access point, the process above is repeated to determine the location of the user. As such, anytime the user makes an emergency 911 call the VELA is able to locate the user and route the call to the appropriate PSAP. Preferably, the VELA includes logic or memory maps that facilitate locating the appropriate PSAP. For example, the VELA may include a database of PSAPs that are associated with either the physical address or the network address in the various user profiles.

When a user dials 911, the softswitch routes the call to the VELA, which routes the call to the appropriate PSAP (see PSAP Interface Technical Options below), based upon the user's current location. No call to an intermediate dispatch center is needed. Alternatively, the softswitch could perform a query to the VELA to obtain the current PSAP for the VoIP user's TN, passing this information back to the softswitch and enabling the softswitch to complete the call itself.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for locating a user making an emergency call over a network using a voice over Internet protocol (VoIP) device, the method comprising:
    determining an emergency call origination network address for the VoIP device upon detecting the emergency call, the emergency call origination network address associated with a current access point on the network through which the VoIP device is making the emergency call;
    locating a user profile associated with the VoIP device making the emergency call, the user profile including a physical address associated with a network address, the physical address detailing a location of the user when accessing the network from the network address;
    determining if the network address in the located user profile matches with the emergency call origination network address; and
    determining the VoIP device to be located at the physical address if the network addresses match.

2. The method of claim 1 further comprising routing the emergency call to a public safety answering point (PSAP) and including therewith the physical address of the VoIP device.

3. A method for locating a voice over Internet telephone (VoIP) device connected to a network, the method comprising:
    determining a current network address for the VoIP device on the network;
    locating a user profile associated with the VoIP device, the user profile including at least one physical address associated with a network address;
    determining if the current network address for the VoIP device matches with any of the network addresses in the user profile; and
    determining a location of the VoIP device to be at the physical address associated with the network address that matches the current network address of the VoIP device.

4. The method of claim 3 wherein the user profile is created dynamically upon connecting the VoIP device to the network.

5. The method of claim 4 wherein the user profile is created dynamically by delivering requests for information to the VoIP device and receiving a response thereto.

6. The method of claim 5 wherein the requests and responses thereto are made through speech commands.

7. The method of claim 3 wherein the user profile is created by a user inputting the physical and network addresses into the user profile.

8. The method of claim 3 further comprising associating a telephone number with the VoIP device and the user profile, the user profile being located based on the telephone number.

9. The method of claim 8 further comprising broadcasting the telephone number from the VoIP device upon connecting the VoIP device to the network.

10. The method of claim 3 further comprising confirming the location of the VoIP device.

11. The method of claim 10 wherein the location of the VoIP device is confirmed by contacting the VoIP device and interrogating a user thereof.

12. The method of claim 11 wherein the VoIP device is contacted through a VoIP call and the interrogation is conducted through speech commands.

13. The method of claim 3 further comprising providing the location of the VoIP device to a public safety answering point (PSAP).

14. The method of claim 13 further comprising determining an emergency call being made on the VoIP device and providing the location of the VoIP device to the PSAP in response thereto.

15. An apparatus comprising:
   a processor;
   a memory having stored therein computer executable instructions, that when executed by the processor, cause the apparatus to perform a method of:
   determining a current network address for a VoIP device on a network;
   locating a user profile associated with the VoIP device, the user profile stored on the memory and including at least one physical address associated with a network address;
   determining if the current network address for the VoIP device matches with any of the network addresses in the user profile; and
   determining a location of the VoIP device to be at the physical address associated with the network address that matches the current network address of the VoIP device.

16. The apparatus of claim 15 wherein the method further performs: creating the user profile dynamically upon the VoIP device connecting to the network.

17. The apparatus of claim 16 wherein the method further performs: communicating with the VoIP device and interrogating the VoIP device through the communication in order to dynamically create the user profile.

18. The apparatus of claim 17 wherein the method further performs: interrogating the VoIP device through speech commands.

19. The apparatus of claim 15 wherein the method further performs: receiving inputs for creating the user profile without requiring connection of the VoIP device to the network.

20. The apparatus of claim 15 wherein the method further performs: locating the user profile based on a telephone number assigned to the VoIP device.

21. The apparatus of claim 20 wherein the method further performs: receiving a broadcasted message having the telephone number from the VoIP device upon connection of the VoIP device to the network.

22. The apparatus of claim 15 wherein the method further performs: confirming the location of the VoIP device.

23. The apparatus of claim 22 wherein the method further performs: confirming the location of the VoIP device by contacting the VoIP device and interrogating a user thereof.

24. The apparatus of claim 23 wherein the method further performs: contacting the VoIP device through a VoIP call whereby the interrogation is conducted through speech commands.

25. The apparatus of claim 15 wherein the method further performs: providing the location of the VoIP device to a public safety answering point (PSAP).

26. The apparatus of claim 15 wherein the method further performs: determining an emergency call being made on the VoIP device and providing the location of the VoIP device to the PSAP in response thereto.

27. The apparatus of claim 26 wherein the method further performs: routing the emergency call to the PSAP.

* * * * *

UNITED STATES PATENT AND TRADEMARK OFFICE
CERTIFICATE OF CORRECTION

PATENT NO. : 7,940,746 B2  Page 1 of 1
APPLICATION NO. : 10/924485
DATED : May 10, 2011
INVENTOR(S) : Jason D. Livingood It is certified that error appears in the above-identified patent and that said Letters Patent is hereby corrected as shown below:

Column 1, Line 48:
    delete "it is a labor" and insert --it is labor--
Column 2, Line 40:
    delete "by connected a" and insert --connected by a--
Column 5, Line 25:
    delete "address" and insert --addresses--
Column 5, Lines 59-60:
    delete "If the user to determine their location."
Column 7, Line 6:
    delete "the utilizes" and insert --that utilizes--
Column 7, Line 6:
    delete "address" and insert --addresses--
Column 7, Line 15:
    delete "user, if not," and insert --user. If not,--
Column 7, Line 21:
    delete "profile." and insert --profile?--
Column 7, Line 26:
    delete "user, if not" and insert --user. If not,--
Column 7, Line 28:
    delete "user." and insert --user?--
Column 7, Line 32:
    delete "user, if" and insert --user. If--

Signed and Sealed this
Twentieth Day of December, 2011

David J. Kappos
*Director of the United States Patent and Trademark Office*